June 8, 1926.
F. J. ANDEL
BRAKE EQUALIZING ATTACHMENT FOR AUTOMOBILES
Filed Feb. 4, 1924   3 Sheets-Sheet 3
1,587,999
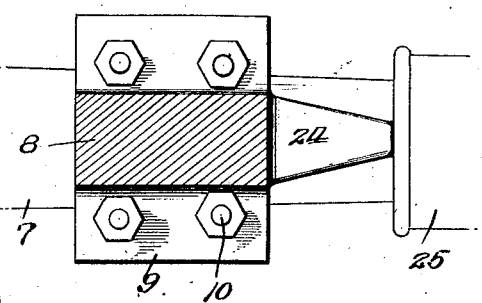
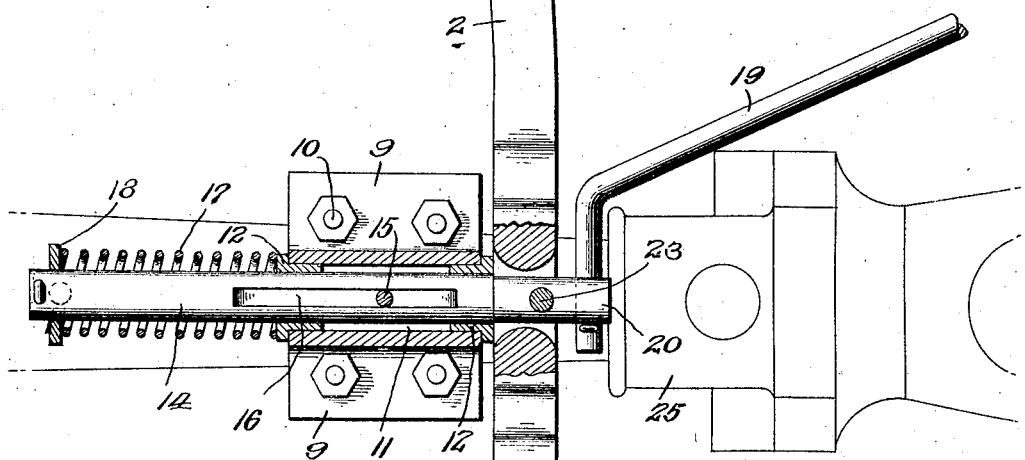
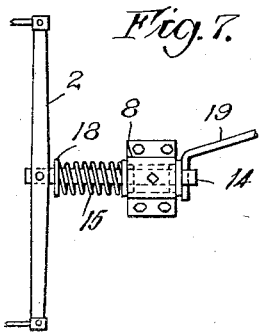
Inventor
Frank J. Andel.
By
Fisher, Moser & Moore
Attys.

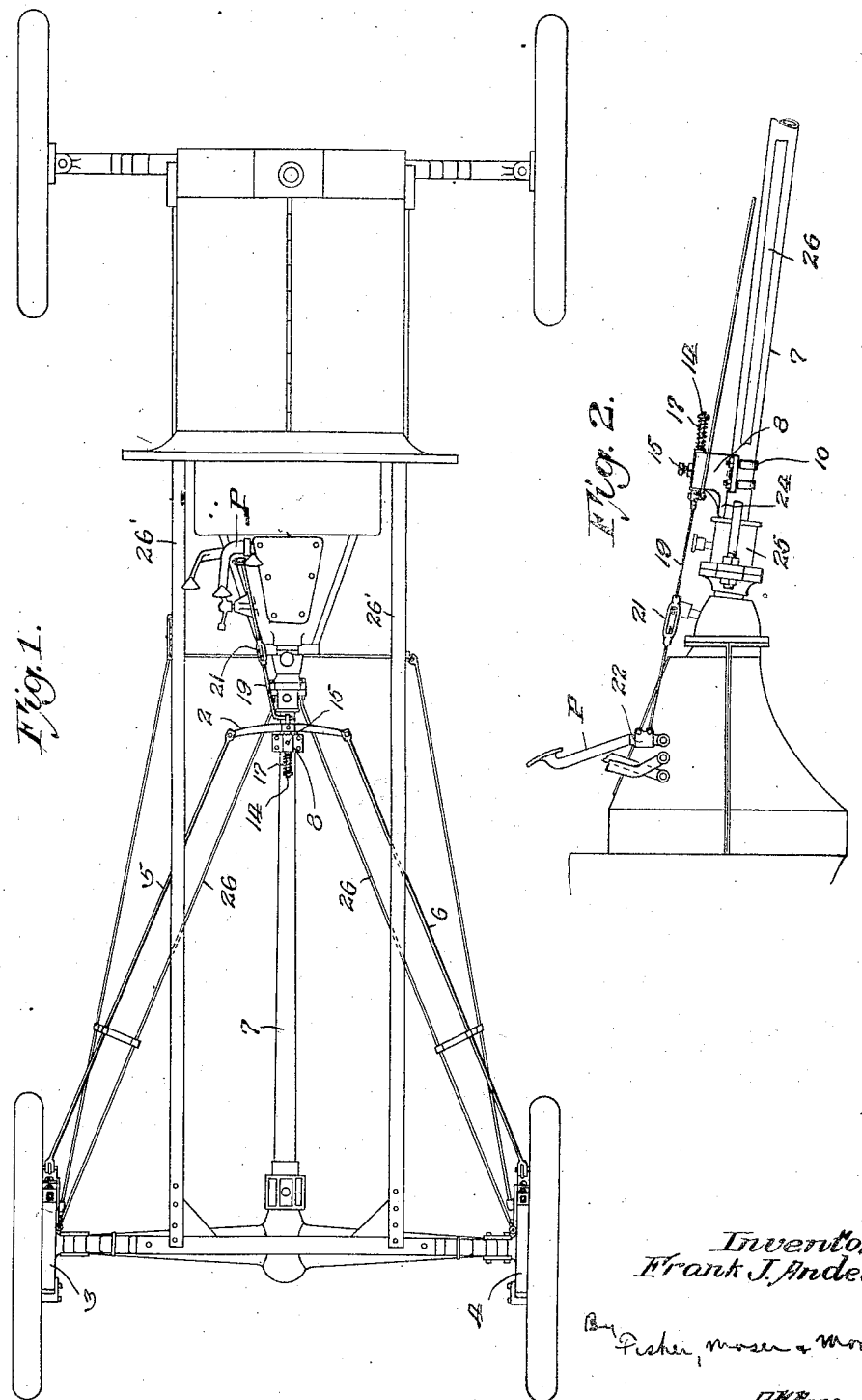

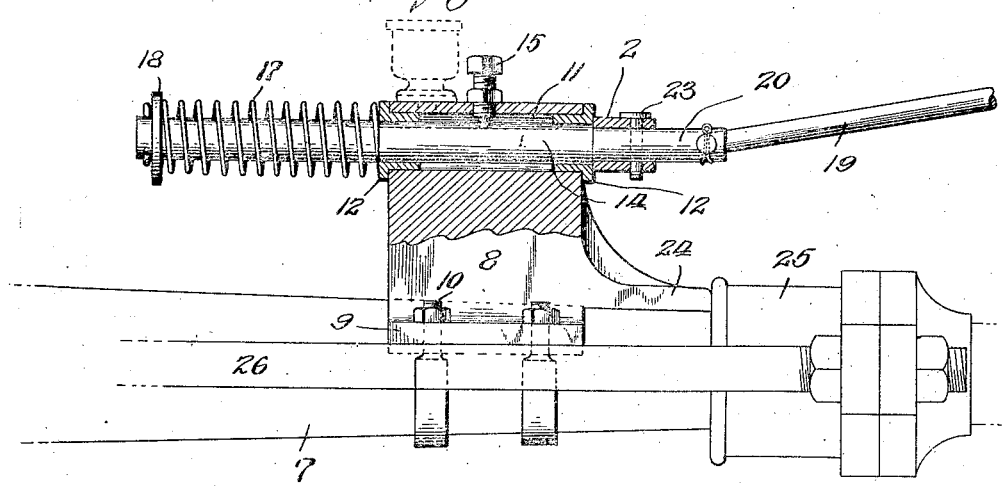
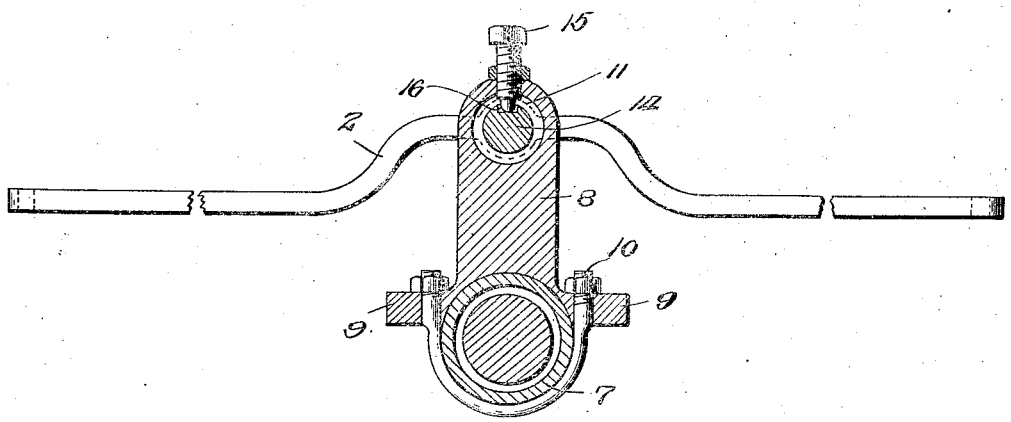

Patented June 8, 1926.

1,587,999

UNITED STATES PATENT OFFICE.

FRANK J. ANDEL, OF CLEVELAND, OHIO.

BRAKE-EQUALIZING ATTACHMENT FOR AUTOMOBILES.

Application filed February 4, 1924. Serial No. 690,576.

My invention relates to an improvement in a brake equalizing attachment for automobiles, my general object being to provide a simple device adapted to control the operation of two rear wheel brakes with an effective and reliable equalizing effect and without bind or undue strain in the operating connections, and a further object is to provide an equalizing device which may be easily and quickly attached and mounted in a stable and secure position upon the drive shaft housing contiguous to the transmission case and withal free to operate without interference with the surrounding parts.

In the accompanying drawings, Fig. 1 is a top plan view of the chassis of an automobile equipped with my equalizing attachment.

Fig. 2 is an enlarged side elevation of the transmission casing and drive shaft housing with the equalizing device attached and connected as in use.

Fig. 3 is an enlarged side view of the equalizing device, partly in section, and Fig. 4 is a vertical section of the same parts looking toward the right.

Fig. 5 is a top plan view and horizontal section of the upper end of the device, and Fig. 6 is also a horizontal section but on a lower plane.

Figs. 7 and 8 are plan and sectional views of modifications of the invention.

In certain types of automobiles, for example the Ford, the drive wheels are provided with brake drums and internal braking devices controlled by a lever which is primarily intended for emergency braking. In the Ford car, the transmission casing contains the main brake bands and braking is effected through the drive shaft and its universal joints. If the universal joints should break the transmission brakes become inoperative. Therefore, various forms of supplemental braking devices have been found useful when applied externally to the wheel brake drums, one such device being shown in my own Letters Patent No. 1,455,562 of May 15, 1923. To equalize the braking action on the two wheels I utilize in the present invention a pivoted equalizing lever 2 which is connected to the operating parts for the separate outer brake bands 3 and 4, respectively, by separate brake rods 5 and 6. Such use of an equalizing lever is not claimed herein as broadly new, but to obtain an equalizing effect without bind or strain, it is desirable that a lever of this kind be mounted centrally on the longitudinally median line of the chassis. However, the control pedal P and the operating connections extending therefrom are usually located at one side of this medial line and any pull imparted through a direct connection to the equalizing lever tends to bind and make a free and responsive operation difficult. To overcome the objection and at the same time permit the equalizing lever to be attached to the tubular housing 7 for the drive or transmission shaft, I provide an upright bracket 8 having lateral flanges 9 which are perforated to receive the screw-threaded ends of one or more bolts or clamping straps 10 in clamping the bracket upon tubular housing 7, see Fig. 4, and the bottom of bracket 8 is preferably recessed or channeled to fit the top of the housing. The upper end of bracket 8 is provided with a horizontal bore 11 paralleling the housing, and bushings 12 at the opposite ends of this bore provide bearings in which a short round shaft 14 is adapted to slide freely within limits. The bushings also form end closure members for bore 11, thereby permitting the space around the shaft to be used as a lubricating chamber. A set-screw 15 at the top of bracket 8 extends into a longitudinal groove 16 in the upper side of the shaft to prevent the shaft from turning in its bearings, and a coiled spring 17 is sleeved loosely upon the shaft but held normally under compression between a collar 18 on the shaft and one of the end bushings 12 in bracket 8. When the brakes are to remain inactive the coiled spring holds the pivoted equalizing lever immovably in a squared position against the flat outer end of one of the bushings 12, and when the brakes are to be set the shaft may be drawn forward on a straight line and without lateral deviation by a pull rod 19 having a bent end pivotally connected with the front extension 20 of shaft 14. This pull rod is made in two pieces with a turn-buckle 21 to adjust and take up slack, and the front end is connected to a detachable clamp 22 affixed to the oscillatory pedal P. Rod 19 is angularly related to shaft 14 but the double bearings or bushings 12 hold the shaft to a straight line of travel under pull, and the pivot pin 23 for the equalizing lever therefore always remains in the vertical plane of the longitudinal median line of the vehicle. If permitted to shift laterally variable change in the arc movements of the lever connections to the brakes would occur which would affect the equalizing operation.

In order that bracket 8 may be properly set conveniently and quickly upon the smaller tapered part of the drive shaft housing 7 and so that ample operating clearance for the lever and its connection may be positively assured without dependence upon a skilled or practiced mechanic in attaching the device, I provide a forwardly-extending lug or projection 24 at the base of bracket 8 which is adapted to abut against the enlarged union or connecting part 25 of the housing to which the radius rods 26 are attached, thereby spacing the bracket a suitable distance from part 25 where the two radius rods converge, while at the same time affording a brace or stop for the bracket in the event of looseness in seating, or attachment of, the bracket. Equalizing lever 2 may be of any desired length and each arm thereof is bent or offset downwardly to permit the brake rods 5 and 6 to extend on straight lines to the brakes and at the same time avoid the side bars 26' of the chassis frame. On the other hand bracket 8 is projected upwardly a sufficient distance to place the reciprocating shaft 14 in a horizontal plane where pull rod 19 may be readily connected to end 20 and placed in the proper working relation without excessive inclination in a vertical plane, or so that the pull on shaft 14 will be on a substantially straight line from pedal P viewed from the side, see Fig. 2.

In lieu of placing equalizing lever 2 at the front end of shaft 14 I may pivot the lever at the extreme rear end where collar 18 is located, see Fig. 7, and instead of using a set screw 15 to prevent shaft 14 from turning in its bearings I may resort to the use of any other known mechanical equivalent for that purpose such as flattening the shaft, as indicated at 28, Fig. 8.

What I regard as my invention or discovery and desire to claim, is:

1. An equalizing brake attachment for automobiles, comprising a bracket adapted to be detachably affixed to the drive shaft housing of the automobile, said bracket having a bore and bushings therein to provide a lubricating chamber, a reciprocable shaft extending through said bushings carried by said bracket, an equalizing lever pivotally connected to said shaft, means adapted to reciprocate said shaft, and brake rods connected with the opposite ends of said equalizing lever.

2. A brake equalizing attachment for an automobile, having a transmission shaft and housing longitudinally thereof and provided with separate brakes for the rear wheels and an operating member for said brakes at one side of the transmission housing, said attachment comprising a bracket and means adapted to detachably secure the same to the transmission shaft housing, a short shaft having bushings secured within said bracket and movable parallelly in respect to said transmission shaft, a spring connected with said shaft to move it in one direction, a pull member to draw said shaft in the opposite direction, and an equalizing lever pivotally connected with said shaft having operating connections with said separate brakes.

3. A brake equalizing attachment for an automobile having a transmission shaft and housing, comprising a bracket and means adapted to affix the same to said housing, a shaft slidably supported within said bracket, means forming a fixed part of said bracket adapted to prevent said shaft from turning, a spring adapted to move said member in one direction, an equalizing lever pivoted to said member having brake rods affixed thereto and an operating element connected with said member.

4. A brake equalizing attachment, comprising a bracket and means adapted to detachably bolt the same to a part of the transmission housing of an automobile, a shaft having slidable bearing within said bracket, a coiled spring sleeve upon said shaft in compressible relation to said bracket, an equalizing lever pivotally connected to said shaft having brake connections, and an operating member connected to said shaft.

5. In an automobile having a transmission shaft housing provided with an enlargement and converging radius rods connected to said enlargement, a brake equalizing attachment comprising a bracket detachably mounted upon said housing contiguous to said enlargement between said converging radius rods, a longitudinally movable shaft supported by said bracket, a coiled spring sleeved upon said shaft, an equalizing lever pivotally connected to said shaft having brake operating connections at its opposite ends, and a draw member connected with said shaft.

6. An equalizing brake attachment for an automobile, comprising an attachment bracket having a bore and spaced bushings therein adapted to provide shaft bearings and a lubricating chamber, a shaft movable longitudinally within said bearings, a coiled spring sleeved upon said shaft adapted to shift the same in one direction, means adapted to shift said shaft in the opposite direction to its spring controlled movement, and an equalizing lever pivotally connected with said shaft having brake connections.

7. In an automobile having a transmission shaft housing provided with an enlargement, a brake equalizing attachment comprising a bracket adapted to be secured to said housing, said bracket having a spacing lug adapted to engage said enlargement, a reciprocable member carried by said bracket having a spring adapted to shift it longitudinally in one direction and an operating connection to move it in the opposite direction, and an equalizing lever pivotally connected to said shaft having brake connections.

8. A brake equalizing attachment for automobiles, comprising a bracket and means adapted to attach the bracket to a part of the transmission housing of the automobile, and also a spacing extension to predetermine its setting upon the housing relatively to other parts of the automobile, and a brake equalizing lever having a movable support and guide mounted upon said bracket.

9. A brake equalizing attachment for an automobile, comprising a bracket and means adapted to clamp the same upon a part of the transmission housing of the automobile, a reciprocable shaft and a bushing therefor within said bracket, means adapted to prevent said shaft from turning in the bushing, a brake equalizing lever pivotally connected with one end of said shaft, a coiled spring sleeved upon said shaft in compressible relation to said bracket adapted to shift the shaft in one direction, and means adapted to move the shaft in the opposite direction to actuate said equalizing lever.

10. A brake equalizing attachment for an automobile having a central longitudinal transmission shaft and housing, comprising an upright bracket having lateral base flanges and provided with a recessed bottom adapted to fit the transmission shaft housing, clamping devices engaging said flanges and housing, the upper part of said bracket having a horizontal bore and a pair of spaced bushings within the opposite ends of said bore, a reciprocable shaft extending through said bushings having an operating connection at one end, a brake equalizing lever connected with said shaft, and a controlling spring mounted upon the shaft in compression relation to said bracket.

In testimony whereof I affix my signature.

FRANK J. ANDEL.